UNITED STATES PATENT OFFICE.

WILHELM MEISER AND CARL KRAUCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PROCESS OF ABSORBING CARBON MONOXID.

1,207,968.      Specification of Letters Patent.     Patented Dec. 12, 1916.

No Drawing.     Application filed February 25, 1915.   Serial No. 10,565.

*To all whom it may concern:*

Be it known that we, WILHELM MEISER and CARL KRAUCH, citizens of the German Empire, residing at Ludwigshafen-on-the Rhine, Germany, have invented new and useful Improvements in Processes of Absorbing Carbon Monoxid, of which the following is a specification.

As cuprous compounds for use in removing carbon monoxid from gas mixtures, cuprous chlorid solutions hitherto have generally been employed. Such solutions, even when they contain ammonia, have the disadvantage that they attack and injure metals, particularly the iron of the apparatus used on a manufacturing scale, depositing copper and destroying the iron vessels.

We have now found that, by employing ammoniacal solutions of cuprous compounds which are substantially free from halogen, carbon monoxid can be absorbed in iron vessels without these being damaged. For example we use solutions of cuprous compounds in the production of which weak acids (such as carbonic acid or organic acids) have been employed, or solutions which have been produced practically without using any acid.

The removal of carbon monoxid is preferably carried out under pressure and the process is of particular value for use in the removal of small quantities of carbon monoxid from hydrogen or gases containing hydrogen.

As examples of methods of preparing solutions for use according to our invention we give the following, but, of course, the invention is not limited to the use of solutions so prepared.

Mix together forty parts, by weight, of cuprous oxid, one hundred parts, by weight, of ammonium carbonate, three hundred parts, by weight, of water and thirty parts, by weight, of twenty-five per cent. aqueous ammonia, allowing, if desired, the access of a small quantity of air, until the cuprous oxid is dissolved. Or dissolve cupric hydrate in ammonia and shake it with finely divided metallic copper. If desired, organic acids, or their salts, can be employed in preparing the ammoniacal cuprous solutions.

The process of removing carbon monoxid from gases containing it with the aid of solutions prepared in the aforesaid manner can be carried out in any known, or suitable, absorption apparatus, the use of the said solutions allowing all parts of the apparatus including conduit-pipes and pumps for circulating the liquid through the apparatus to consist of iron without having to fear that the apparatus will be attacked by the copper-containing absorbing liquid. For instance, the gas to be treated can be passed into and through a tower into which the ammoniacal cuprous solution is sprayed, or in which the said solution is distributed over a large surface, or the gas can be passed through washing bottles containing the absorbing liquid. In either case the apparatus preferably should be made so as to be capable to withstand pressure, so that the operation can be carried out, if desired, under a pressure of say ten, or hundred atmospheres, the absorption of the carbon monoxid going on the more rapidly the higher the employed pressure is.

Now what we claim is:—

1. The process of absorbing carbon monoxid from gases containing it, which consists in treating the said gases in iron apparatus with an ammoniacal solution of cuprous compounds substantially free of halogen.

2. The process of absorbing carbon monoxid from gases containing it, which consists in treating the said gases in iron apparatus with an ammoniacal solution of cuprous compounds containing a weak acid but substantially free of halogen.

3. The process of absorbing carbon monoxid from gases containing it, which consists in treating the said gases in iron apparatus with an ammoniacal solution of cuprous oxid substantially free of halogen.

In testimony whereof we have hereunto set our hands in the presence of two subscribing witnesses.

WILHELM MEISER.
            CARL KRAUCH.

Witnesses:
    ARTHUR DENONVILLE,
    ANDREAS HELE.